United States Patent  
Lindsay

(10) Patent No.: US 6,254,132 B1
(45) Date of Patent: Jul. 3, 2001

(54) FRAME FOR TRANSPORTING A BUILDING STRUCTURE ON A WHEEL ASSEMBLY

(76) Inventor: Fredrick H. Lindsay, 9393 - 120th La. North, Seminole, FL (US) 34642

( * ) Notice: Subject to any disclaimer, the term of this patent is extended or adjusted under 35 U.S.C. 154(b) by 0 days.

(21) Appl. No.: 09/369,753

(22) Filed: Aug. 6, 1999

Related U.S. Application Data

(60) Provisional application No. 60/095,629, filed on Aug. 7, 1998.

(51) Int. Cl.[7] .................................................... B62D 63/06
(52) U.S. Cl. ........................................... 280/789; 280/799
(58) Field of Search ..................................... 280/789, 799

(56) References Cited

U.S. PATENT DOCUMENTS

| | | |
|---|---|---|
| 1,677,577 | 7/1928 | Amiot . |
| 1,837,374 | 12/1931 | Samuel . |
| 2,123,931 | 7/1938 | Bunker . |
| 2,284,898 | 6/1942 | Hartman . |
| 2,743,940 | 5/1956 | Bohlen . |
| 2,925,727 | 2/1960 | Harris et al. . |
| 3,254,914 | 6/1966 | Steck . |
| 3,492,767 | 2/1970 | Pincus . |
| 3,664,082 | 5/1972 | Zintel . |
| 3,697,098 | 10/1972 | Fisher . |
| 3,716,267 | 2/1973 | Lindsay . |
| 4,015,375 | 4/1977 | Lindsay . |
| 4,019,299 | 4/1977 | Lindsay . |
| 4,065,892 | 1/1978 | Lawrence . |
| 4,067,158 | 1/1978 | Lawrence . |
| 4,106,258 | 8/1978 | Lindsay . |
| 4,441,289 | 4/1984 | Ikuo et al. . |
| 4,669,243 | 6/1987 | Gore et al. . |
| 4,863,189 | 9/1989 | Lindsay . |
| 4,930,809 | 6/1990 | Lindsay . |
| 4,971,355 | * 11/1990 | Studdard ............................... 280/798 |
| 5,028,072 | 7/1991 | Lindsay . |
| 5,113,625 | 5/1992 | Davis . |
| 5,201,546 | 4/1993 | Lindsay . |
| 5,226,583 | 7/1993 | Imashimizu et al. . |
| 5,359,821 | 11/1994 | Merriman . |
| 5,468,008 | * 11/1995 | Hecht ................................... 280/789 |
| 5,488,809 | 2/1996 | Lindsay . |
| 5,553,989 | 9/1996 | Ullman . |
| 5,579,622 | 12/1996 | DeVon et al. . |
| 5,640,814 | 6/1997 | Godfrey . |
| 5,671,573 | 9/1997 | Tadros et al. . |
| 5,863,070 | * 1/1999 | Williams et al. ..................... 280/789 |

FOREIGN PATENT DOCUMENTS

| 822893 | 11/1951 | (DE) . |
|---|---|---|
| 1562963 | 4/1969 | (FR) . |

\* cited by examiner

*Primary Examiner*—Kenneth R. Rice
(74) *Attorney, Agent, or Firm*—Frijouf, Rust & Pyle, P.A.

(57) ABSTRACT

An improved frame for transporting a building structure on a wheel assembly. The frame comprises a first and a second longitudinally extending beam with each longitudinally extending beam having a major vertical height. A first and a second structural beam defines a minor vertical height. The first and second structural beams are interposed between a front segment and a rear segment of the longitudinally extending beams. The wheel assembly is mounted to a bottom portion of the structural beams thereby lowering the vertical height of top portions of the structural beams and the longitudinally extending beams.

30 Claims, 6 Drawing Sheets

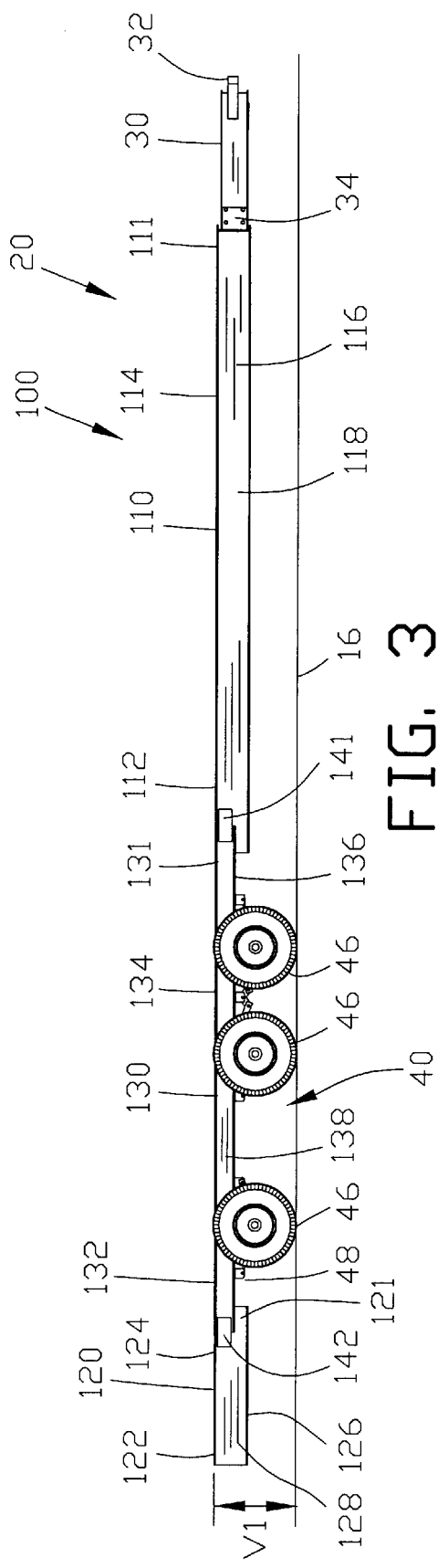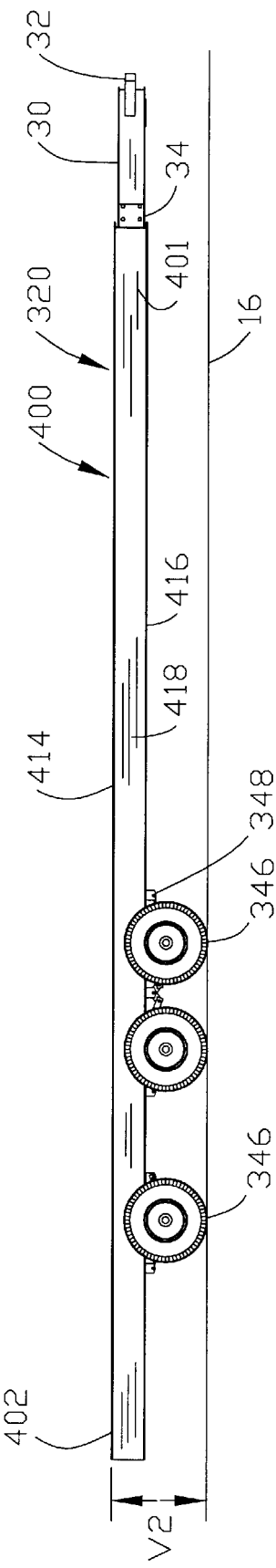

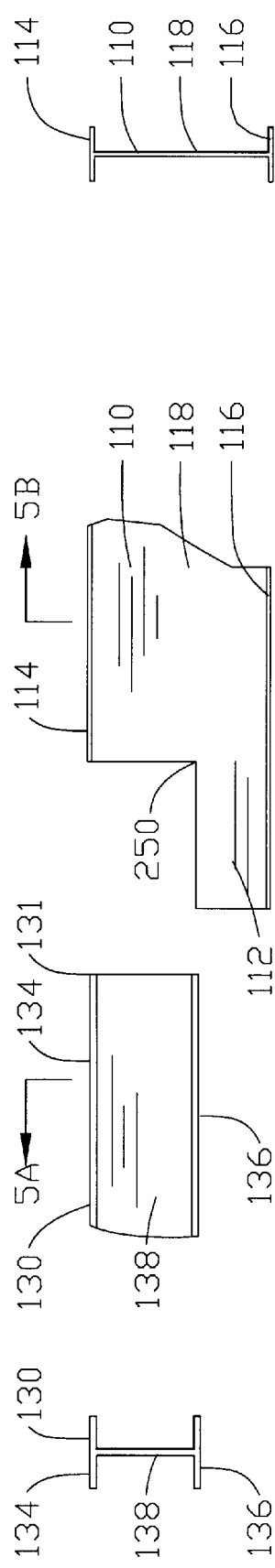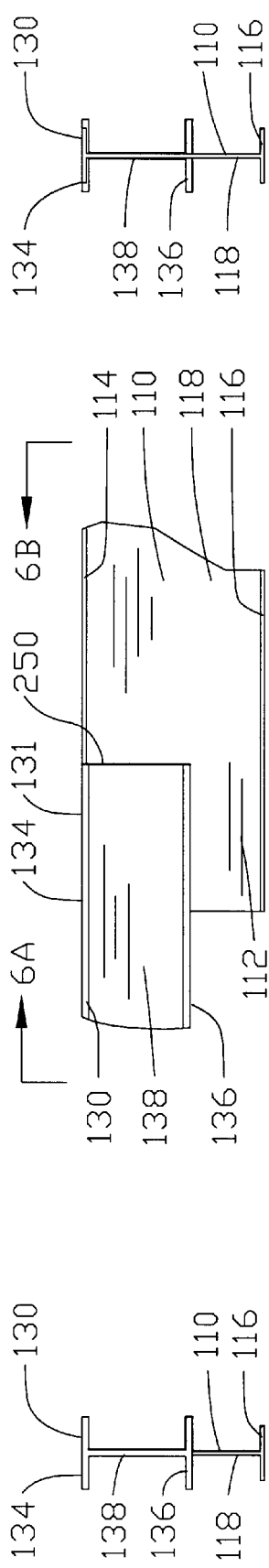

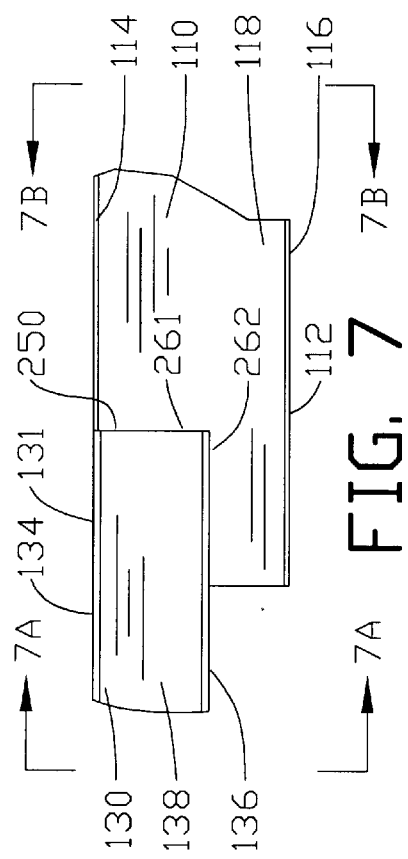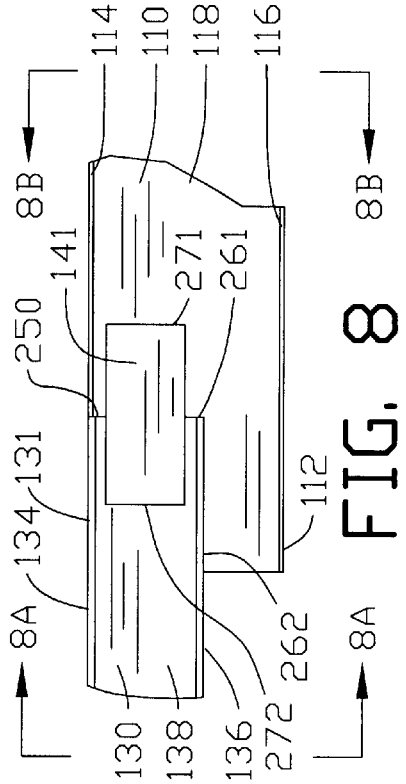

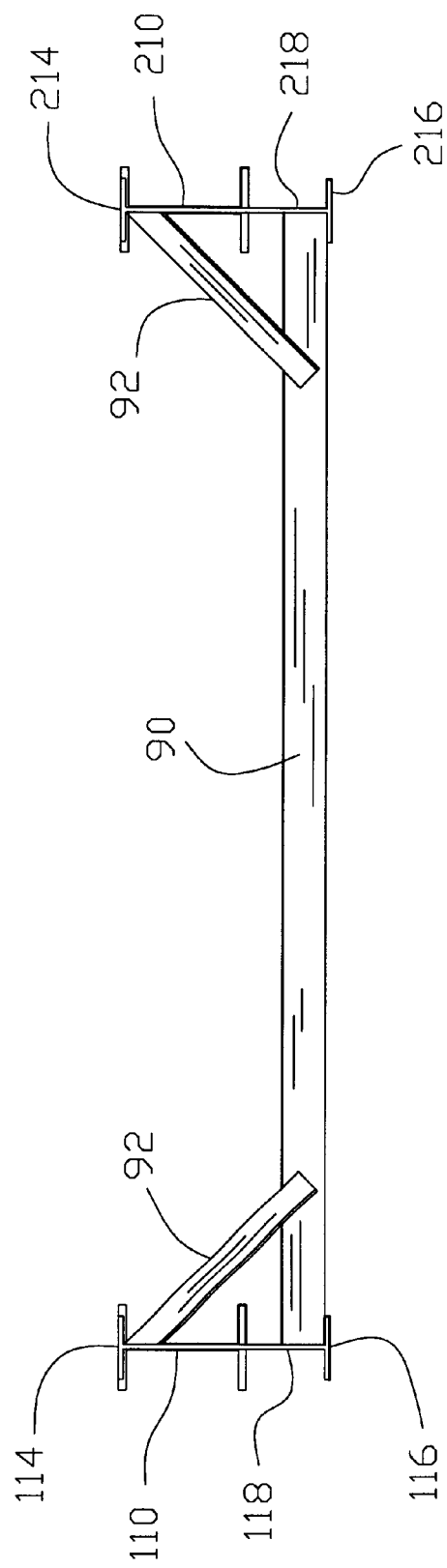

FRAME FOR TRANSPORTING A BUILDING STRUCTURE ON A WHEEL ASSEMBLY

CROSS REFERENCE TO RELATED APPLICATIONS

This application claims priority to U.S. Provisional application Ser. No. 60/095,629 filed Aug. 7, 1998 the entire content of which is incorporated by reference into the present application.

BACKGROUND OF THE INVENTION

1. Field of the Invention

This invention relates to manufactured homes and more particularly to an improved frame for transporting a manufactured home that lowers the overall height of the manufactured home during the transportation thereof.

2. Background of the Invention

In recent years, the manufactured home industry has substantially increased the quality of materials and construction of manufactured homes. This increase in quality and construction has been the result of superior materials, superior construction techniques, and new innovations which have resulted in a substantial increase in performance with a reduction in cost.

In general, a manufactured home is erected in an automated manufacturing factory using modern patterns, assembly line, and modern assembly equipment. The use of these automation techniques substantially reduces the cost and the time of construction of the manufactured home. After the manufactured home is completed, the manufactured home is stored on supports to await transportation to a permanent site for the manufactured home.

The manufactured home is loaded on a transportation carrier for transportation to the permanent site for the manufactured home. The manufactured home is positioned onto the transportation carrier by crane or other lifting means. The transportation carrier comprises a steel frame assembly supported by plural axles and transport wheels. The transportation carrier includes a hitch for attaching the transportation carrier to a towing vehicle such as a truck for transporting the manufactured home to the permanent site.

After the manufactured home is towed to the permanent site, the manufactured home is removed from the transportation carrier by a crane or other lifting means and the manufactured home is positioned on a foundation at the permanent home site. After removal of the manufactured home, the carrier transport is towed back to the manufacturing factory by a towing vehicle such as a truck for use in delivering another manufactured home. Unfortunately, the carrier transport is returned to the manufacturing factory without a load thereby substantially increasing the overall cost of delivery of the manufactured home. It is estimated that the cost of returning the carrier transport to the manufacturing factory is approximately one dollar per mile. Furthermore, the task of moving the manufactured home from the carrier transport to the foundation at the permanent home site requires the use of a crane or other lifting means. Accordingly, the transportation and installation of manufactured homes requiring the use of a carrier transport substantially adds to the overall cost of the manufactured home.

Among the most significant construction innovations developed in the manufactured home industry is the use of a dual purpose flooring system for a manufactured home. The dual purpose flooring system for a manufactured home comprises plural longitudinally extending beams and a multiplicity of transverse cross beams. The plural longitudinally extending beams are preferably steel I-beams with the multiplicity of transverse cross beams comprising wooden trusses.

The dual purpose flooring system provides a first function for the manufactured home by providing a removable transport wheel assembly and a removable hitch assembly for transporting the manufactured home to the permanent home site. Preferably, a removable transport wheel assembly and a removable hitch assembly are secured to the plural longitudinally extending beams for transporting the manufactured home and eliminating the need for an independent transportation carrier. When the manufactured home reaches the permanent home site, the removable transport wheel assembly and a removable hitch assembly are removed from the manufactured home and are shipped to the manufacturing factory. Only the removable transport wheel assembly and a removable hitch assembly which comprise the most expensive portions of a transport carrier need to be returned to the manufacturing factory. In addition, the removable transport wheel assembly and a removable hitch may be returned to the manufacturing factory by a conventional freight carrier thus eliminating the need for using the towing vehicle as was the problem in the prior art manufactured home carrier transports.

The dual purpose flooring system provides a second function for the manufacturated home by providing a right floor for supporting the manufactured home at the permanent home site. The plural longitudinally extending beams remain with the manufactured home after removal of the removable transport wheel assembly and the removable hitch assembly to provide a rigid support to the permanently mounted manufactured home. The plural longitudinally extending beams remains with the manufactured home to add to the structural integrity and strength of the flooring system. Several examples of the aforementioned dual purpose flooring system are disclosed in the following U.S. Letters Patent of the presented inventor.

The dual purpose flooring system provides a third function for the manufactured home by reducing the overall height of the manufactured home when the manufactured home is being transported to the permanent home site. Since the removable transport wheel assembly and the removable hitch assembly are directly secured to the plural longitudinally extending beams of the manufactured home, the dual purpose flooring system reduces the overall height of the manufactured home, the dual purpose flooring system reduces the overall height of the manufactured home during transportation by the thickness of the frame of the carrier transport of the prior art.

Typically, the carrier comprises a steel structure fashioned from I-beams that are from ten to twelve inches in height. Typically, an axle is mounted on leaf springs which are secured to the bottom portion of each of the I-beams of the carrier. Accordingly, the frame of structure reduces the overall height of the building structure during transportation by the thickness of the carrier. Typically, the thickness of the carrier is ten to twelve inches.

The overall height of the building structure during transportation is extremely important since overall height of the building structure must be below the maximum permitted transportation height established by the U.S. Department of Transportation. The building structure must be below the maximum permitted transportation height in order to easily pass under typical roadway bridges, underpasses, tunnels and the like. Presently, the maximum permitted transportation height established by the U.S. Department of Housing and Urban Development is thirteen feet six inches.

In the event the transportation height of a building structure exceeds fourteen feet, than the building structure must be preceded by a flag truck having a fourteen foot sensor to detect any roadway bridges, underpasses, tunnels and the like that would prevent the passing of the building structure thereunder. In the event the flag truck detects any roadway bridges, underpasses, tunnels and the like that would prevent the passing of the building structure thereunder this maximum permitted transportation height, the building structure must be routed to avoid this obstacle. Accordingly, the transportation of a building structure in excess of the maximum permitted transportation height adds significantly to the cost of the transportation.

The pitch or slope of the roof of a building structure is limited by the maximum permitted transportation height established by the U.S. Department of Transportation. A greater pitch or slope of a roof has a distinct advantage for building structures located in regions with inclement weather such as rain, snow or ice. Secondly, a greater pitch or slope of a roof approximates the pitch or slope of a roof of a site built home.

U.S. Pat. No. 4,019,299 to Lindsay discloses an improved floor assembly being incorporated into a mobile building. A pair of identical frame assemblies form the floor of the building each including a plurality of middle beams mounted to and atop lower beams and further including a pair of adjacent interior sidewalls attached to the middle beams and extending therebeneath being adjacent the lower beams. The exterior sidewalls are mounted to the frame assemblies. Wheeled carriages are removably mountable to the assemblies facilitating transportation of the assemblies to a building site. A skirt is permanently mounted externally to the sidewalls and extends adjacent the floor assembly. A bracket is connected to the middle beam and the bottom beam of each frame assembly and in addition is connected to a pole which supports the adjacent middle portions of the frame assemblies. The interior sidewalls are slidably received in the bracket. In an alternate embodiment, the floor frame assembly is incorporated into a floor joist.

U.S. Pat. No. 4,863,189 to Lindsay discloses a floor frame assembly, formed principally of wood material, having two load-bearing outer beams and front and rear end members defining a periphery and a plurality of transverse load-supporting trusses connected normal to the outer beam between the end members. In a preferred embodiment, each truss has an upper elongate member, a shorter central elongate member attached parallel thereto by vertical cross-braced elements, and on either side of the central member a braced vertical member spaced therefrom to provide gaps of predetermined height and width. Each truss also has an end portion of the upper elongate member in cantilever form for contact thereat with a load-supporting surface at the permanent location of the floor assembly, so that additional external beams or continuous wall surfaces to support the completed floor frame assembly and any superstructure thereon is rendered unnecessary. The floor frame assembly may be further supported by conventional piers or jackposts at points under two elongate, load-supporting, inner beams closely received and connected to the trusses within the gaps. These inner beams may optionally be made of wood material, wood material supported along the edges at selected portions by metal reinforcement, or entirely formed of I-section beam lengths. In one aspect of the invention, at least one of the load-supporting outer beams has a larger vertical dimension than the other outer beam and two floor frame assemblies thus formed may be united at their respective wider outer beams and provided additional support thereunder to generate a commensurately larger floor frame assembly structure.

U.S. Pat. No. 5,028,072 to Lindsay discloses a unified floor frame assembly having two elongate outer load supporting beams formed of elongate beam sections that are butt-spliced to be cambered in parallel vertical planes to counter forces that may tend to cause sagging of the floor frame assembly during transportation. At inner vertical perimeter surfaces of the elongate beams are provided attachment plates for attachment, first, of a wheel carrier assembly detachably mountable thereto with a plurality of wheels partially recessed within the floor frame assembly and, second, a towing hitch assembly attachable to a forward end of the floor frame assembly for applying a towing force thereat. A moisture, dirt, insect and pest excluding thin covering is provided underneath the floor frame assembly and sections of heating and ventilating ducting, piping, wiring and the like are includable during manufacture of the floor frame assembly. Individual floor frame assemblies may be supported at their permanent location underneath the periphery or, where two such floor frame assemblies are to be coupled to obtain a larger size floor, central elongate beams may be supported by metal posts. Upon delivery of the floor frame; assembly to its intended location, the wheel carrier assembly and the towing hitch assembly are both detached and removed therefrom for reuse.

U.S. Pat. No. 5,201,546 to Lindsay discloses a towable unified floor frame assembly deriving lengthwise strength from two elongate I-beams disposed symmetrically about a longitudinal axis. The I-beams are separated by a plurality of angle-sectioned metal cross members welded therebetween. A plurality of trusses, corresponding in number and location to the metal cross member, is disposed to support an outer perimeter and a floor thereabove. Each truss incorporates upwardly inclined bracing elements located outwardly of the I-beams connected to flat metal connecting elements individually unified to the I-beams, preferably by welding. A waterproof and dirt-excluding cover entirely covers the underneath of the floor frame assembly. Heating and ventilating ducts, power and telephone wires, water and waste pipes, thermal insulation and the like, are installed within the floor frame assembly. The entire floor frame assembly, and any superstructure built thereon, may be readily towed to a selected location on a plurality of wheels detachably mounted to brackets provided underneath the I-beams, a towing force being applied by a forwardly disposed detachable towing hitch.

U.S. Pat. No. 5,488,809 to Lindsay discloses a lightweight, strong, safely transportable modular unified floor assembly including a lengthwise wooden girder beam formed with male and female ends to facilitate cooperative integration thereby to another similar floor assembly. In another aspect of the invention, the floor assembly is manufactured with a stairwell opening of selected size and at a selected location. The floor assembly even with a stairwell opening according to this invention is strong enough to be transported comfortably and safely from its point of manufacture to the site at which it is to be located for use.

The first advantage of the dual purpose flooring system is the elimination of the need for a transport carrier for transporting the manufactured home to a permanent site. The second advantage of the dual purpose flooring system is the additional strength of the flooring system over the conventional flooring system of the prior art. The third advantage of the dual purpose flooring system is the reduction of the overall height of the manufactured home when the manufactured home is being transported to the permanent home site.

It is a primary purpose of the present invention to improve upon the aforementioned dual purpose flooring system to provide a more superior manufactured home. It is a specific purpose of the present invention to provide an improved frame for transporting a building structure on a wheel assembly wherein the frame can be lowered during transportation relative to the frames of the prior art.

Another object of this invention is to provide an improved frame for transporting a building structure on a wheel assembly wherein the frame may be further lowered during transportation for enabling the roof pitch of the building structure to be increased to a level heretofore unknown in the prior art.

Another object of this invention is to provide an improved frame for transporting a building structure on a wheel assembly wherein the frame raises the level of an axle of the transport wheel assembly for lowering the overall height of the building structure during transportation of the building structure.

Another object of this invention is to provide an improved frame for transporting a building structure on a wheel assembly wherein the frame has a strength at least as great as a conventional dual purpose flooring system.

Another object of this invention is to provide an improved frame for transporting a building structure on a wheel assembly which does not substantially increase the cost of the frame.

Another object of this invention is to provide an improved frame for transporting a building structure on a wheel assembly that is adaptable to existing manufacturing processes of manufactured homes.

Another object of this invention is to provide an improved frame for transporting a building structure on a wheel assembly that facilitates the assembly of the manufactured home in the manufacturing factory.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved frame for transporting a building structure on a wheel assembly. The improved frame comprises a first and a second longitudinally extending beam with each of the first and second longitudinally extending beams having a front segment and a rear segment. Each of the first and second longitudinally extending beams has a major vertical height defined between a bottom portion and a top portion of each of the longitudinally extending beams. A first and a second structural beam is provided with each of the first and second structural beam extending between a front end and a rear end. Each of the first and second structural beams has a minor vertical height defined between a bottom portion and a top portion of each of the structural beams. The minor vertical height of each of the structural beams is selected to be substantially less than the major height of each of the longitudinally extending beams. A connector interconnects the first and second ends of the first and second structural beams to the front segment and rear segments of the first and second longitudinally extending beams, respectively, with the top portion of each of the structural beams being aligned with the top portion of each of the longitudinally extending beams. The wheel assembly is removably mounted to the bottom portion of the first and second structural beams thereby lowering the vertical height of the top portions of the structural beams and the longitudinally extending beams.

In a more specific embodiment of the invention, the first and second longitudinally extending beams are disposed in a substantially parallel orientation and are constructed of a metallic material. The first and second structural beams are constructed of a metallic material. Preferably, the first and second longitudinally extending beams are metallic I-beams and each of the first and second structural beams are metallic I-beams.

In one embodiment of the invention, each of the first and second structural beams has a thickness greater than the thickness of each of the first and second longitudinally extending members. The first and second structural beams may have a horizontal width greater than a horizontal width of each of the first and second longitudinally extending members. In addition, the first and second structural beams may have a wall thickness which is greater than the wall thickness of the longitudinally extending beams.

In one embodiment of the invention, the first and second structural beams are spliced within a void between the front and rear segments of each of the first and second longitudinally extending members, respectively. The front and rear segments of the first and second longitudinally extending members include notches for receiving the front and rear ends of the first and second structural beams. The first and second structural beams are welded to the front and rear segments of the first and second longitudinally extending members. A coupling plate may overlie each of the welds of the front and rear ends of each of the first and second structural beams to the front and rear segments of the first and second longitudinally extending members.

Preferably, the wheel assembly is mounted to the bottom portion of the first and second structural beams thereby lowering the vertical height of the top portions of the structural beams and the longitudinally extending beams relative to a ground surface a distance equal to the difference between the major height minus the minor height. The wheel assembly comprises an axle for journaling plural transport wheels. An axle mounting removably mounts the axle to the first and second structural beams.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 3 is a side view of an improved frame of the present invention for transporting the building structure on a wheel assembly;

FIG. 4 is a side view of a frame of the prior art for transporting the building structure on a wheel assembly;

FIG. 5 is an enlarged side view of a portion of a longitudinally extending beam illustrating a front segment and a structural beam located in a spaced apart relationship;

FIG. 5A is a view along line 5A—5A in FIG. 5;

FIG. 5B is a view along line 5B—5B in FIG. 5;

FIG. 6 is an enlarged side view of the front segment engaging the structural beam;

FIG. 6A is a view along line 6A—6A in FIG. 6;

FIG. 6B is a view along line 6B—6B in FIG. 6;

FIG. 7 is an enlarged side view of the front segment welded to the structural beam;

FIG. 7A is a view along line 7A—7A in FIG. 7;

FIG. 7B is a view along line 7B—7B in FIG. 7;

FIG. 8 is an enlarged side view of a coupling plate interconnecting the front segment and the structural beam;

FIG. 8A is a view along line 8A—8A in FIG. 8;

FIG. 8B is a view along line 8B—8B in FIG. 8;

FIG. 9 is a view along line 9—9 in FIG. 1; and

FIG. 10 is a view along line 10—10 in FIG. 1.

Similar reference characters refer to similar parts throughout the several Figures of the drawings.

DETAILED DISCUSSION

Figure 1:
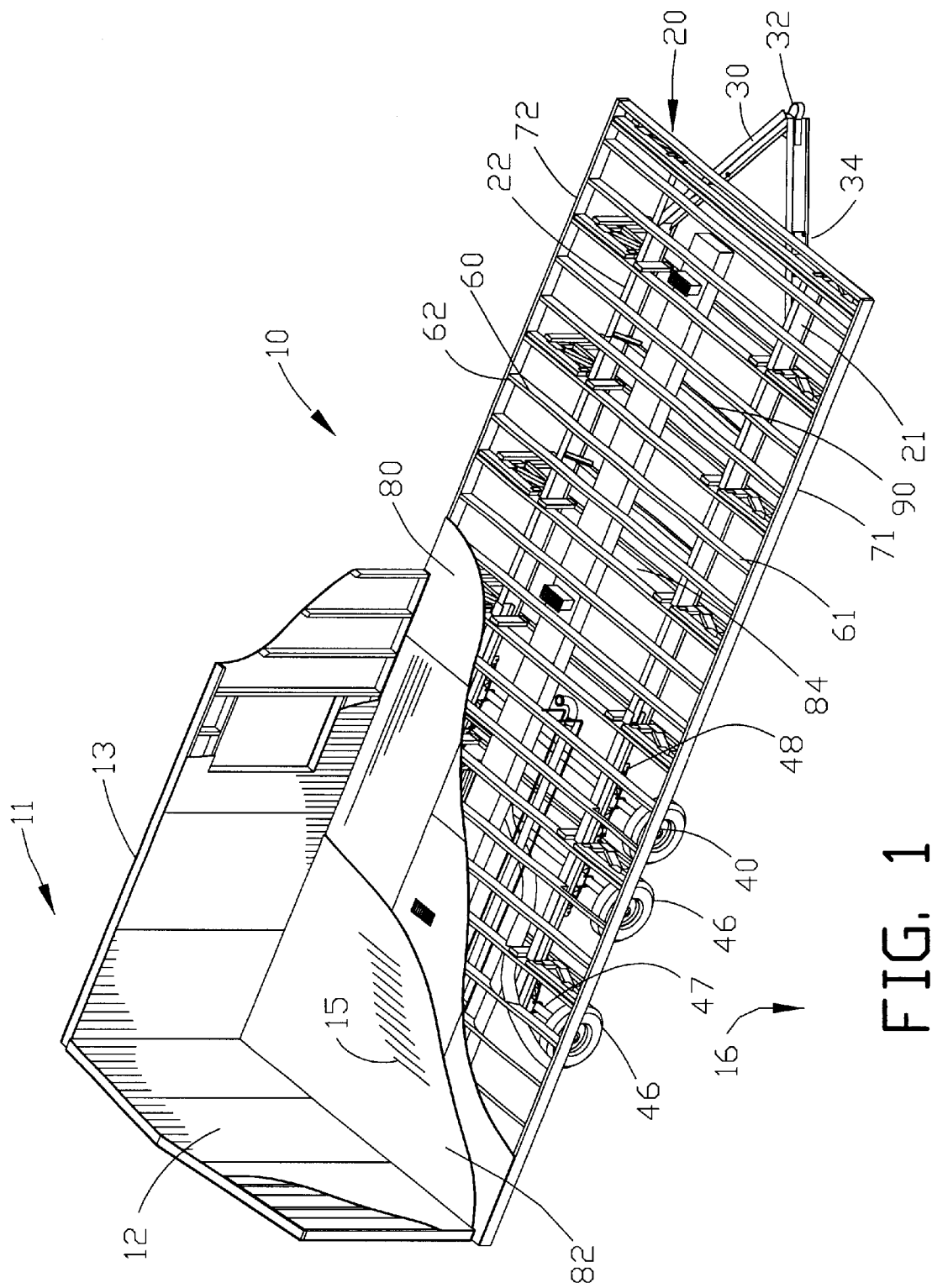
FIG. 1 is an isometric cut away view of a building structure shown as a manufactured home incorporating a frame of the present invention for transporting the building structure on a wheel assembly.

FIG. 1 is an isometric cut away view of a building structure 10 shown as a manufactured home. The building structure 10 comprises peripheral walls 11 including peripheral walls 12 and 13 and a floor 15. The manufactured home 10 is designed to be transported to a remote location and to be erected on a ground surface 16 at a building site. Typically, the manufactured home 10 is towed by a towing vehicle such as a truck (not shown) to the building site.

The manufactured home 10 has a frame 20 comprising frame elements 21 and 22 shown as steel I-beams disposed in a substantially parallel orientation. A removable hitch assembly 30 is removably secured to the first and second frame elements 21 and 22. The removable hitch assembly 30 comprises a towing hitch 32 and a hitch mounting 34 for removably mounting the removable hitch assembly 30 to the first and second frame elements 21 and 22. The removable hitch assembly 30 may be attached to a towing vehicle (not shown) to transport the manufactured home 10 to the building site.

A plurality of removable axle and transport wheel assemblies 40 is removably mounted to the first and second frame elements 21 and 22. Each of the plurality of wheel assemblies 40 has plural wheels 46 journalled on an axle 47 and secured to the frame elements 21 and 22 by springs 48.

Upon reaching the building site, the manufactured home 10 is positioned over a foundation located on the ground surface. The foundation may be concrete, compressed gravel or gravel depending upon the applicable building code or regulation. The manufactured home 10 is lifted through the use of simple lifting jacks and the removable hitch 30 and the removable axle and transport wheel assemblies 40 are removed from the manufactured home 10. The manufactured home 10 is then lowered onto the foundation. In one embodiment of the invention, the manufactured home 10 may be supported on the foundation through the frame elements 21 and 22. Preferably, the frame elements 21 and 22 are connected to the foundation by conventional fasteners to secure the manufactured home 10 to the building site.

After the removable hitch 30 and the removable axle and transport wheel assemblies 40 have been removed from the manufactured home 10, the removable hitch 30 and the removable axle and transport wheel assemblies 40 may be returned to the manufacturing facility for reuse in transporting another manufactured home to another building site. The removable hitch 30 and the removable transport wheel assembly 40 may be returned to the manufacturing factory by a conventional freight carrier.

The frame elements 21 and 22 support a multiplicity of transverse beams 60 arranged in a substantially parallel relationship. The plurality of transverse beams 60 are supported by the top portions of the frame elements 21 and 22. A first and a second peripheral beam 71 and 72 are respectively connected to the opposed ends of each of the multiplicity of transverse beams 60. Preferably, each of the plurality of transverse beams 60 and each of the first and second peripheral beams 71 and 72 are constructed of a wood material.

The multiplicity of transverse beams 60 support a flooring sheeting 80 that is covered by a conventional flooring material 82 such as carpeting, tile or the like. Voids 84 are defined within the multiplicity of transverse beams 60 for accommodating and receiving pipes, electrical conduits, air ducts or the like. A plurality of stringers or reinforcing beams 90 interconnect the first and second longitudinally extending frame elements 21 and 22 for increasing the loading of the peripheral walls 11.

Figure 2:
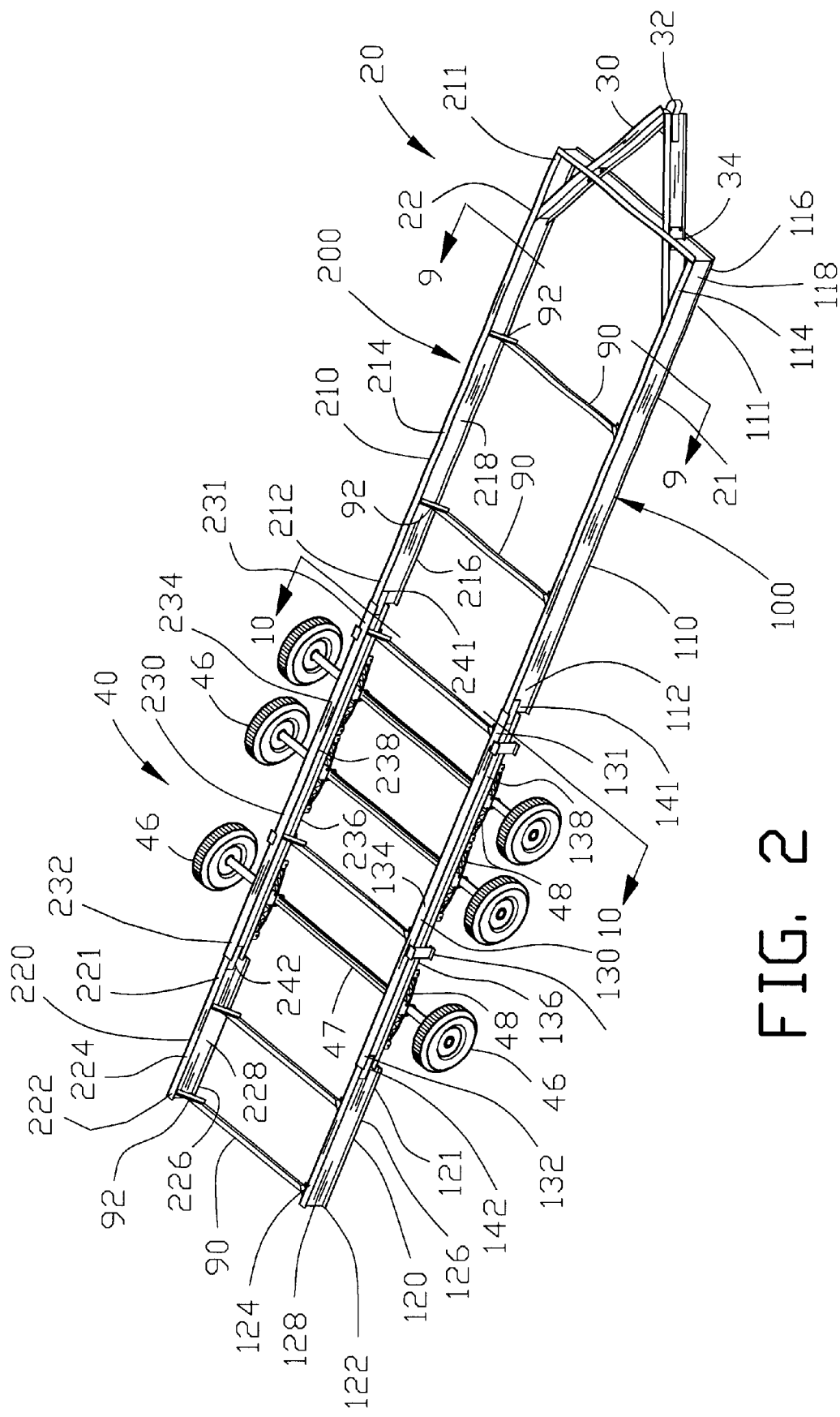
FIG. 2 is an isometric view of the frame of the present invention shown in FIG. 1.

FIGS. 2 and 3 are isometric and side views of the frame 20 of the present invention shown in FIG. 1. The frame elements 21 and 22 comprise a first and a second longitudinally extending beam 100 and 200. The first longitudinally extending beam 100 comprises a first front segment 110, a first rear segment 120 and a first structural beam 130.

The first front segment 110 extends between a first and a second end 111 and 112. The first front segment 110 is shown as a metallic I-beam having a top portion 114 and a bottom portion 116 interconnected by an interconnecting portion 118. The top and bottom portions 114 and 116 of the first front segment 110 are substantially horizontally oriented with the interconnecting portion 118 of the first front segment 110 being substantially vertically oriented. The first front segment 110 has a major vertical height defined between the top and bottom portions 114 and 116 of the first front segment 110. Each of the top, bottom and interconnecting portions 114 116 and 118 of the first front segment 110 defines a primary wall thickness.

The first rear segment 120 extends between a first and a second end 121 and 122. The first rear segment 120 is shown as a metallic I-beam having a top portion 124 and a bottom portion 126 interconnected by an interconnecting portion 128. The top and bottom portions 124 and 126 of the first rear segment 120 are substantially horizontally oriented with the interconnecting portion 118 of the first rear segment 120 being substantially vertically oriented. The first rear segment 120 has a major vertical height defined between the top and bottom portions 124 and 126 of the first rear segment 120. Each of the top, bottom and interconnecting portions 124, 126 and 128 of the first rear segment 120 defines a primary wall thickness.

The first structural beam 130 extends between a first and a second end 131 and 132. The first structural beam 130 is shown as a metallic I-beam having a top portion 134 and a bottom portion 136 interconnected by an interconnecting portion 138. The top and bottom portions 134 and 136 of the first structural beam 130 are substantially horizontally oriented with the interconnecting portion 138 of the first structural beam 130 being substantially vertically oriented. The first structural beam 130 has a minor vertical height defined between the top and bottom portions 134 and 136 of the first structural beam 130. Each of the top, bottom and interconnecting portions 134, 136 and 138 of the first structural beam 130 defines a secondary wall thickness.

The minor vertical height of the first structural beam 130 is substantially less than the: major vertical height of each of the first front and rear segments 110 and 120. Each of the top, bottom and interconnecting portions 134, 136 and 138 of the first structural beam 130 define the secondary wall thickness that is greater than the primary wall thicknesses of the first front and rear segments 110 and 120. Each of the top and bottom portions 134 and 136 of the first structural beam 130 defines a horizontal width greater than a horizontal width of each of the top portions 114 and 124 and the bottom portions 134 and 136 of the first front and rear segments 110 and 120.

The first and second ends 131 and 132 of the first structural beam 130 interconnects the front segment and rear segments 110 and 120 of the first longitudinally extending beam 100. The top portion 134 of the structural beam 130 is aligned with the top portions 114 and 124 of each of the front segments and rear segments 110 and 120 of the longitudinally extending beam 100. Accordingly, the bottom portion 136 of the first structural beam 130 is raised vertically relative to the bottom portions 116 and 126 of each of the front segment and rear segments 110 and 120 of the longitudinally extending beam 100 thereby creating a recess 140 in the longitudinally extending beam 100. A plurality of coupling plates 141 and 142 reinforce the interconnection of the first and second ends 131 and 132 of the first structural beam 130 to the front segment and rear segments 110 and 120 of the first longitudinally extending beam 100.

The second front segment 210 extends between a first and a second end 211 and 212. The second front segment 210 is shown as a metallic I-beam having a top portion 214 and a bottom portion 216 interconnected by an interconnecting portion 218. The top and bottom portions 214 and 216 of the second front segment 210 are substantially horizontally oriented with the interconnecting portion 218 of the second front segment 210 being substantially vertically oriented. The second front segment 210 has a major vertical height defined between the top and bottom portions 214 and 216 of the second front segment 210. Each of the top, bottom and interconnecting portions 214, 216 and 218 of the second front segment 210 defines a primary wall thickness.

The second rear segment 220 extends between a first and a second end 221 and 222. The second rear segment 220 is shown as a metallic I-beam having a top portion 224 and a bottom portion 226 interconnected by an interconnecting portion 228. The top and bottom portions 224 and 226 of the second rear segment 220 are substantially horizontally oriented with the interconnecting portion 228 of the second rear segment 220 being substantially vertically oriented. The second rear segment 220 has a major vertical height defined between the top and bottom portions 224 and 226 of the second rear segment 220. Each of the top, bottom and interconnecting portions 224, 226 and 228 of the second rear segment 220 defines a primary wall thickness.

The second structural beam 230 extends between a first and a second end 231 and 232. The second structural beam 230 is shown as a metallic I-beam having a top portion 234 and a bottom portion 236 interconnected by an interconnecting portion 238. The top and bottom portions 234 and 236 of the second structural beam 230 are substantially horizontally oriented with the interconnecting portion 238 of the second structural beam 230 being substantially vertically oriented. The second structural beam 230 has a minor vertical height defined between the top and bottom portions 234 and 236 of the second structural beam 230. Each of the top, bottom and interconnecting portions 234, 236 and 238 of the second structural beam 230 defines a secondary wall thickness.

The minor vertical height of the second structural beam 230 is substantially less than the major vertical height of each of the second front and rear segments 210 and 220. Each of the top, bottom and interconnecting portions 234, 236 and 238 of the second structural beam 230 defines the secondary wall thickness that is greater than the primary wall thicknesses of the second front and rear segments 210 and 220. Each of the top and bottom portions 234 and 236 of the first structural beam 230 defines a horizontal width greater than a horizontal width of each of the top portions 214 and 224 and the bottom portions 234 and 236 of the second front and rear segments 210 and 220.

The first and second ends 231 and 232 of the second structural beam 230 interconnects the front segment and rear segments 210 and 220 of the second longitudinally extending beam 200. The top portion 234 of the structural beam 230 is aligned with the top portions 214 and 224 of each of the front segment and rear segments 210 and 220 of the longitudinally extending beam 200. Accordingly, the bottom portion 236 of the first structural beam 230 is raised vertically relative to the bottom portions 216 and 226 of each of the front segment and rear segments 210 and 220 of the longitudinally extending beam 200 thereby creating a recess 240 in the longitudinally extending beam 200. A plurality of coupling plates 241 and 242 reinforce the interconnection of the first and second ends 231 and 232 of the second structural beam 230 to the front segment and rear segments 210 and 220 of the second longitudinally extending beam 200.

The first and second longitudinally extending beams 100 and 200 are interconnected in a parallel and spaced apart position by the plurality of stringers 90. As will be described in greater detail hereinafter, a plurality of stringers 90 interconnect the front segments 110 and 210 and a plurality of stringers 90 interconnect the rear segments 120 and 220 of the first and second longitudinally extending beams 100 and 200. A plurality of angle brackets 92 secure the plurality of stringers 90 to the first and second longitudinally extending beams 100 and 200.

A plurality of stringers 90A interconnect the structural beams 130 and 230 of the first and second longitudinally extending beams 100 and 200. A plurality of angle brackets 92A secure the plurality of stringers 90A to the first and second longitudinally extending beams 100 and 200.

The plurality of removable axles and transport wheel assemblies 40 are removably mounted to the bottom portions 136 and 236 of the first and second structural beams 130 and 230 by the springs 48. Since the plurality of wheel assemblies 40 are secured to the bottom portions 136 and 236 of the first and second structural beams 130 and 230, the top portions 134 and 234 of the first and second structural beams 130 and 230 are vertically lowered relative to the ground surface 16. In a similar manner, the top portions 114 and 214 and 124 and 224 of the first and second front and rear segments 110 and 120 and 210 and 220 of the first and second longitudinally extending beams 100 and 200 are vertically lowered relative to the ground surface 16. The improved frame 20 of the present invention defines a vertical height of V1.

FIG. 4 is a side view of a frame 320 of the prior art for transporting the building structure 10 shown in FIG. 1 on a wheel assembly 340. The frame 320 comprises a first longitudinally extending beam 400 extending between a first and a second end 401 and 402. The first longitudinally extending beam 400 is shown as a metallic I-beam having a top portion 414 and a bottom portion 416 interconnected by an interconnecting portion 418. The top and bottom portions 414 and 416 are substantially horizontally oriented with the interconnecting portion 418 being substantially vertically oriented. The first longitudinally extending beam 400 has a major vertical height defined between the top and bottom portions 414 and 416. Each of the top, bottom and interconnecting portions 414, 416 and 418 of the first longitudinally extending beam 400 defines a primary wall thickness.

The frame 320 comprises a second longitudinally extending beam (not shown) located and connected in a manner similar to the second longitudinally extending beam 200 shown in FIGS. 1–3. The plurality of removable axle and transport wheel assemblies 340 are removably mounted to the bottom portion 416 of the first longitudinally extending beam 400 by the springs 348. The frame 320 of the prior art defines a vertical height of V2.

A comparison of the improved frame 20 of the present invention and the frame 320 of the prior art illustrates the lowering the vertical height of the top portions first and second longitudinally extending beams 100 and 200 relative to the ground surface 16. The vertical height of V1 of the improved frame 20 of the present invention is substantially less than the vertical height of V2 of the frame 320 of the prior art due to the recesses 140 and 240. The mounting of the removable transport wheel assembly 40 to the bottom portions 136 and 236 of the first and second structural beams 130 and 230 within the recesses 140 and 240 thereby lowers the vertical height of the top portions of the first and second longitudinally extending beams 100 and 210 relative to the ground surface 16 a distance equal to the difference between the major vertical height minus the minor vertical height. The lowering of the vertical height of the top portions of the first and second longitudinally extending beams 100 and 200 relative to the ground surface 16 lowers the overall height of the manufactured home 10 during the transportation thereof.

FIGS. 5–8 are enlarged side views of a portion of a first longitudinally extending beam 100 illustrating a preferred embodiment of constructing the first longitudinally extending beams 100 of the present invention. The construction of the first and second longitudinally extending beams 100 and 200 of the present invention is shown with reference to a portion of the second end 112 of the first front segment 110 and the first end 131 of the first structural beam 130.

FIG. 5 is an enlarged side view of a portion of the second end 112 of the first front segment 110 and the first end 131 of the first structural beam 130 located in a spaced apart relationship. FIG. 5A is a view along line 5A—5A in FIG. 5 with FIG. 5B being a view along line 5B—5B in FIG. 5.

Each of the front and rear segments 110, 120, 210 and 220 of the first and second longitudinally extending members 100 and 200 includes a notch 250 for receiving the front and rear ends 131, 132, 231 and 232 of the first and second structural beams 130 and 230. Preferably, the notch 250 is a substantially rectangular notch for receiving the front and rear ends 131, 132, 231 and 232 of the first and second structural beams 130 and 230. The notch may be formed by a cutting torch or any other suitable means.

FIG. 6 is an enlarged side view of the second end 112 of the first front segment 110 engaging the first end 131 of the first structural beam 130. FIG. 6A is a view along line 6A—6A in FIG. 6 with FIG. 6B being a view along line 6B—6B in FIG. 6. The notch 250 is dimensioned to receive the first end 131 of the first structural beam 130 with the top portion 134 of the first structural beam 130 being aligned with the top portion 114 of the first front segment 110.

FIG. 7 is an enlarged side view of the second end 112 of the first front segment 110 welded to the first end 131 of the structural beam 130. FIG. 7A is a view along line 7A—7A in FIG. 7 with FIG. 7B being a view along line 7B—7B in FIG. 7. The first end 131 of the first structural beam 130 is welded to the second end 112 of the first front segment 110 by welds 261 and 262.

FIG. 8 is an enlarged side view of the coupling plate 141 interconnecting the second end 112 of the front segment 110 and the first end 131 of the structural beam 130. FIG. 8A is a view along line 8A—8A in FIG. 8 with FIG. 8B being a view along line 8B—8B in FIG. 8. The coupling plate 141 extends over the second end 112 of the front segment 110 and the first end 131 of the structural beam 130 and overlying each of the welds 261 and 262. The coupling plate 141 is welded to the second end 112 of the front segment 110 and the first end 131 of the structural beam 130 by welds 271 and 272. Preferably, a coupling plate 141A and 141B is located on each of the opposed sides of the interconnecting portion 138 of the first structural beam 130 as shown in FIGS. 8A and 8B.

FIG. 9 is a view along line 9—9 in FIG. 1 illustrating the plurality of stringers 90 interconnecting the front segments 110 and 210 and interconnecting the rear segments 120 and 220 of the first and second longitudinally extending beams 100 and 200. The plurality of stringers 90 are connected to the bottom portions 116 and 216 and the interconnecting portions 118 and 218 of the front segments 110 and 210. The plurality of angle brackets 92 secure the plurality of stringers 90 to the top portions 114 and 214 and the interconnecting portions 118 and 218 of the front segments 110 and 210. Preferably, the plurality of stringers 90 and the plurality of angle brackets 92 are connected to the front segments 110 and 210 by a welding process.

FIG. 10 is a view along line 10—10 in FIG. 1 illustrating the plurality of stringers 90A interconnecting the structural beams 130 and 230 of the first and second longitudinally extending beams 100 and 200. In this embodiment, sections 110A and 210A are affixed to the structural beams 130 and 230, respectively. Preferably, the sections 110A and 210A are short sections of an I-beam similar to the front segments 110 and 210.

The top portions 114A and 214A of the sections 110A and 210A are connected to the top portions 134 and 234 of the structural beams 130 and 230 by welding or any other suitable means. The plurality of stringers 90A are connected to the bottom portions 116A and 216A of the sections 110A and 210A. The plurality of angle brackets 92A secure the plurality of stringers 90A to the top portions 134 and 234 and the interconnecting portions 138 and 238 of the structural beams 130 and 230. Preferably, the plurality of stringers 90A and the plurality of angle brackets 92A are connected by a welding process.

In one example of the invention, the front and rear segments 111 and 120 were made of steel I-beam having a vertical height of 12 inches with a horizontal width of 2.875 inches. The wall thickness of the top and bottom portions 114 and 116 was 0.375 inches whereas the wall thickness of the interconnecting portion 118 was 0.125 inches. In another example of the invention, the front and rear segments 111 and 120 were made of steel I-beam having a vertical height of 10 inches. The structural beam 130 was made of steel I-beam having a vertical height of 6 inches with a horizontal width of 4.0 inches. The wall thickness of the top and bottom portions 134 and 136 was 0.625 inches whereas the wall thickness of the interconnecting portion 138 was 0.25 inches.

The present invention discloses an improved frame 20 defining the recesses 140 and 240 in the first and second longitudinal extending beams 100 and 200 for removably mounting the transport wheel assembly 40. The recesses 140 and 240 lower the overall vertical height of the improved frame 20 of the present invention.

Although the embodiment shown in the present specification illustrates the use of structural beams 130 and 230 for creating the recesses 140 and 240, the recesses 140 and 240 may be created by a cut-out in each of the longitudinal extending I-beams 100 and 200. The cut-out in each of the longitudinal extending I-beams 100 and 200 create the recesses 140 and 240 without the need for the structural beams 130 and 230. Reinforcement plates similar to the coupling plates 141 of 142 may be used to reinforce the longitudinal extending beams 100 and 200 in proximity to the cut-outs.

The present invention provides an improved frame for transporting a building structure on a wheel assembly wherein the frame can be lowered during transportation relative to the frames of the prior art. The improved frame raises the level of an axle of the transport wheel assembly for lowering the overall height of the building structure during transportation of the building structure. The improved frame enables the roof pitch of the building structure to be increased to a level heretofore unknown in the prior art.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved mounting for securing a transport wheels assembly to a frame, the frame comprising a first and a second longitudinally extending beam with each of the first and second longitudinally extending beams defining a height between an upper horizontal surface and a lower horizontal surface, the transport wheels assembly comprising an axle for journaling plural wheels, the improvement comprising:

a recess defined within each of the first and second longitudinally extending beams for defining a first beam segment and a second beam segment for each of said first and second longitudinally extending beams;

a high strength coupling interconnecting said first and second beam segments of each of said first and second longitudinally extending beams;

said coupling having a height which is substantially less than said height of each of said first and second longitudinally extending beams; and an axle mounting for securing the axle relative to said coupling for raising the axle relative to said first and second longitudinally extending beams.

2. An improved mounting for securing a transport wheels assembly to a frame as set forth in claim 1 wherein each of said first and second longitudinally extending beams is an I-beam.

3. An improved mounting for securing a transport wheels assembly to a frame as set forth in claim 1 wherein each of said first and second longitudinally extending beams is a steel I-beam.

4. An improved mounting for securing a transport wheels assembly to a frame as set forth in claim 1, wherein each of said first and second longitudinally extending beams is defined within a frame of a building structure.

5. An improved mounting for securing a transport wheels assembly to a frame as set forth in claim 1, wherein said coupling is welded to each of said first and second beam segments of each of said first and second longitudinally extending beams.

6. An improved mounting for securing a transport wheels assembly to a frame as set forth in claim 1, wherein said coupling has a vertical height which is less than one-half the vertical height of each of said first and second longitudinally extending beams.

7. An improved mounting for securing a transport wheels assembly to a frame as set forth in claim 1, wherein each of said first and second longitudinally extending beams is an I-beam comprising an upper horizontal beam element;

said coupling comprising a structural I-beam comprising a upper horizontal structure element being in alignment with said upper horizontal beam element of each of said first and second longitudinally extending I-beams; and said coupling having a vertical height substantially less than the vertical height of said I-beam.

8. An improved mounting for securing a transport wheels assembly to a frame as set forth in claim 1, wherein said axle mounting removably secures the axle relative to said coupling.

9. An improved mounting for securing a transport wheels assembly to a frame as set forth in claim 1, wherein said axle mounting secures the axle to rests on a bottom surface of said coupling.

10. An improved frame for transporting a building structure on a wheel assembly, comprising:

a first and a second longitudinally extending beam with each of said first and second longitudinally extending beams having a front segment and a rear segment;

each of said first and second longitudinally extending beams having a major vertical height defined between a bottom portion and a top portion of each of said longitudinally extending beams;

a first and a second structural beam with each of said first and second structural beam extending between a front end and a rear end;

each of said first and second structural beams having a minor vertical height defined between a bottom portion and a top portion of each of said structural beams;

said minor vertical height of each of said structural beams being substantially less than said major vertical height of each of said longitudinally extending beams;

a connector interconnecting said first and second ends of said first and second structural beams to said front segment and rear segments of said first and second longitudinally extending beams, respectively, with said top portion of each of said structural beams being aligned with said top portion of each of said longitudinally extending beams; and a mounting for removably mounting the wheel assembly to said bottom portion of said first and second structural beams thereby lowering the vertical height of said top portions of said structural beams and said longitudinally extending beams.

11. An improved frame for transporting a building structure on a wheel assembly as set forth in claim 10, wherein said first and second longitudinally extending beams are disposed in a substantially parallel orientation.

12. An improved frame for transporting a building structure on a wheel assembly as set forth in claim 10, wherein each of said first and second longitudinally extending beams is constructed of a metallic material; and each of said first and second structural beams being constructed of a metallic material.

13. An improved frame for transporting a building structure on a wheel assembly as set forth in claim 10, wherein each of said first and second longitudinally extending beams is a metallic I-beam; and each of said first and second structural beams being a metallic I-beam.

14. An improved frame for transporting a building structure on a wheel assembly as set forth in claim 10, wherein each of said first and second longitudinally extending beams is a metallic I-beam having an interconnecting portion located between said top portion and said bottom portion;

said top and bottom portions of said I-beam being substantially horizontally oriented with said interconnecting portion of said I-beam being substantially vertically oriented.

15. An improved frame for transporting a building structure on a wheel assembly as set forth in claim 10, wherein each of said first and second structural beams is a metallic I-beam having an interconnecting portion located between said top portion and said bottom portion;

said top and bottom portions of said I-beam being substantially horizontally oriented with said interconnecting portion of said I-beam being substantially vertically oriented.

16. An improved frame for transporting a building structure on a wheel assembly as set forth in claim 10, wherein each of said first and second structural beams has a thickness greater than the thickness of each of said first and second longitudinally extending members.

17. An improved frame for transporting a building structure on a wheel assembly as set forth in claim 10, wherein each of said first and second structural beams has a horizontal width greater than a horizontal width of each of said first and second longitudinally extending members.

18. An improved frame for transporting a building structure on a wheel assembly as set forth in claim 10, wherein each of said first and second longitudinally extending beams is a n I-beam having a longitudinally extending beam wall thickness; and each of said first and second structural beams being an I-beam having a structural beam wall thickness which is greater than said longitudinally extending beam wall thickness.

19. An improved frame for transporting a building structure on a wheel assembly as set forth in claim 10, wherein said first and second structural beams are spliced within a void between said front and rear segments of each of the first and second longitudinally extending members, respectively.

20. An improved frame for transporting a building structure on a wheel assembly as set ford in claim 10, wherein said front and rear segments of said first and second longitudinally extending members includes a notch for receiving said front and rear ends of said first and second structural beams; and said first and second structural beams being welded to said front and rear segments of said first and second longitudinally extending members.

21. An improved frame for transporting a building structure on a wheel assembly as set forth in claim 10, wherein said front and rear segments of said first and second longitudinally extending members includes a substantially rectangular notch for receiving said front and rear ends of said first and second structural beams; and said front and rear ends of said first and second structural beams being welded to said front and rear segments of said first and second longitudinally extending members.

22. An improved frame for transporting a building structure on a wheel assembly as set forth in claim 10, wherein said front and rear segments of said first and second longitudinally extending members includes a substantially rectangular notch for receiving said front and rear ends of said first and second structural beams;

said front and rear ends of said first and second structural beams being welded to said front and rear segments of said first and second longitudinally extending members; and a coupling plate overlying each of said welds of said front and rear ends of each of the first and second structural beams to said front and rear segments of said first and second longitudinally extending members.

23. An improved frame for transporting a building structure on a wheel assembly as set forth in claim 10, wherein said front and rear segments of said first and second longitudinally extending members includes a substantially rectangular notch for receiving said front and rear ends of said first and second structural beams;

said front and rear ends of said first and second structural beams being welded to said front and rear segments of said first and second longitudinally extending members; and opposed coupling plates overlying opposed sides of each of said welds of said front and rear ends of each of the first and second structural beams to said front and rear segments of said first and second longitudinally extending members.

24. An improved frame for transporting a building structure on a wheel assembly as set forth in claim 10, wherein said mounting removably mounts the wheel assembly to said bottom portion of said first and second structural beams thereby lowering the vertical height of said top portions of said structural beams and said longitudinally extending beams relative to a ground surface a distance equal to the difference between said major vertical height minus said minor vertical height.

25. An improved frame for transporting a building structure on a wheel assembly as set forth in claim 10, wherein said mounting for removably mounting the wheel assembly to said bottom portion of said first and second structural beams comprises an axle for journaling plural transport wheels; and an axle mounting for removably mounting said axle to said first and second structural beams.

26. An improved frame for transporting a building structure on a wheel assembly as set forth in claim 10, including a plurality of transverse beams being supported by said top portions of said longitudinally extending beams and said structural beams in a substantially perpendicular relationship by said first and second longitudinally extending beams.

27. An improved frame for transporting a building structure on a wheel assembly as set forth in claim 10, including a plurality of transverse beams being supported by said top portions of said longitudinally extending beams and said structural beams in a substantially perpendicular relationship by said first and second longitudinally extending beams; and each of said plurality of transverse beams being constructed of a wood material.

28. An improved frame for transporting a building structure on a wheel assembly as set forth in claim 10, including a plurality of transverse beams being supported by said top portions of said longitudinally extending beams and said structural beams in a substantially perpendicular relationship by said first and second longitudinally extending beams; and a first and a second peripheral beam connected to opposed ends of each of said plurality of transverse beams.

29. An improved frame for transporting a building structure on a wheel assembly as set forth in claim 10, including a removable hitch assembly removably secured to said first and second longitudinally extending beams for attaching to a towing vehicle to transport the manufactured home; and said removable hitch assembly comprising a towing hitch and a hitch mounting for removably mounting said towing hitch to said first and second longitudinally extending beam.

30. An improved frame for transporting a building structure on a wheel assembly as set forth in claim 10, including a removable hitch assembly removably secured to said first and second longitudinally extending beams for attaching to a towing vehicle to transport the manufactured home;

said removable hitch assembly comprising a towing hitch and a hitch mounting for removably mounting said towing hitch to said first and second longitudinally extending beam for enabling said towing hitch to be removed from said first and second longitudinally extending beams.

\* \* \* \* \*